(12) United States Patent
Chilukoor et al.

(10) Patent No.: US 7,746,778 B2
(45) Date of Patent: Jun. 29, 2010

(54) RESOURCE BASED DATA RATE CONTROL

(75) Inventors: Murali Chilukoor, Bangalore (IN); Jain Philip, Bangalore (IN); Prabhanjan Moleyar, Bangalore (IN); Sunil Kumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 625 days.

(21) Appl. No.: 11/638,031

(22) Filed: Dec. 12, 2006

(65) Prior Publication Data

US 2008/0137534 A1    Jun. 12, 2008

(51) Int. Cl.
*H04L 12/26* (2006.01)
(52) U.S. Cl. .................... 370/230.1; 370/401
(58) Field of Classification Search ......... 370/229–237, 370/394, 396, 401, 487; 709/231, 232
See application file for complete search history.

(56) References Cited

U.S. PATENT DOCUMENTS

| | | | |
|---|---|---|---|
| 4,995,056 A * | 2/1991 | Fogg et al. ................. 375/220 |
| 5,634,006 A * | 5/1997 | Baugher et al. ............. 709/228 |
| 6,084,934 A * | 7/2000 | Garcia et al. ................ 375/370 |
| 6,594,701 B1 * | 7/2003 | Forin ........................... 709/232 |
| 7,212,492 B1 * | 5/2007 | Au et al. ...................... 370/229 |
| 2002/0024952 A1 * | 2/2002 | Negishi et al. .............. 370/394 |
| 2002/0167950 A1 * | 11/2002 | Chang et al. ................ 370/396 |
| 2003/0169688 A1 * | 9/2003 | Mott ............................ 370/230 |
| 2004/0085901 A1 * | 5/2004 | Hooper et al. .............. 370/235 |
| 2005/0147032 A1 * | 7/2005 | Lyon et al. .................. 370/229 |
| 2006/0072615 A1 * | 4/2006 | Narad et al. ................ 370/474 |

* cited by examiner

*Primary Examiner*—Kwang B Yao
*Assistant Examiner*—Andrew Lai
(74) *Attorney, Agent, or Firm*—Blakely, Sokoloff, Taylor & Zafman LLP (57) ABSTRACT

A method implemented in a node to forward data packets via a communication link to another node. The method includes receiving an indication of a resource level associated with one or more ports among the other node's ingress and egress ports. The indication to be received via a side-band communication link coupled to the other node. The method further includes forwarding one or more data packets associated with data to the other node based on the indicated resource level received via the side-band communication link.

23 Claims, 7 Drawing Sheets

RESOURCE BASED DATA RATE CONTROL

BACKGROUND

In networking environments communication mediums linking nodes are continually operating at higher link speeds (e.g., 1 gigabits/second or greater). In addition, some nodes in a network may have numerous ports to receive or forward data packets associated with data. This data may follow a data or a control path as it is processed and/or is forwarded by the receiving node. The data path requires less node resources since it is primarily port specific. But the control path uses more node resources (e.g., processing power, memory and bandwidth). More node resources are used because the control path needs the node's resources to support many features for all the ports in the node, e.g., various lookups, access control, port arbitration, etc.

In one example, resource constraints at a receiving node on a communication link may lead to congestion. In this example, a forwarding node may forward the data at a rate faster than the receiving node can process. The resource constraints at the receiving node may lead to a throughput/processing disparity between the two nodes. As a result, congestion in the receiving node may occur for data that follows either a data or control path.

Flow control is an example way of addressing congestion at the receiving end of a communication link. One typical way to implement flow control is to send a message via the communication link (in-band), for example, a pause frame. The message instructs one or more other nodes to stop forwarding data to a congested node until another message is sent from the congested node that instructs the transmitting node(s) to remove the pause and begin/continue to forward the data. This type of in-band flow control is used, for example, between nodes communicating in an Ethernet Local Area Network (LAN) operating in compliance with the Institute for Electrical and Electronic Engineers (IEEE) 802.3 standard for the CSMA/CD (Carrier Sense Multiple Access with Collision Detection) protocol. See IEEE 802.3-2002: IEEE Standard for Information technology—Telecommunications and information exchange between systems—Local and metropolitan area networks—Specific requirements Part 3: CSMA/CD Access Method and Physical Layer Specifications, published August 2002, and/or later versions of the standard (the "Ethernet standard").

Another way to implement flow control is using a given Packet to Packet Gap (PPG) at the transmitting node. In one example, PPG is a sum of an Inter Packet Gap (IPG) and a packet length or size. Stated differently, PPG may be the gap between the start times of two consecutive packets. The given PPG is typically determined based on the disparity in the throughput capability (e.g., packets/unit of time) of the transmitting node as compared to the receiving node over a communication medium.

DETAILED DESCRIPTION

As mentioned in the background, resource constraints at a receiving node may lead to congestion on a communication link between nodes. Flow control measures may be used to reduce the effects of congestion. As described in the background, these flow control measures may include in-band pause frames or a given PPG. But both these flow control measures may be problematic to the most efficient use of bandwidth on a communication link between nodes.

Flow control via in-band pause frames has two potential problems. First, the congested node in some instances may have to wait for a period of time to send a message to remove a pause to the other node. Second, there is a delay in the time it takes for the other node to decode and respond to the message to remove a pause. For example, if a large data packet is to be forwarded, the congested node typically waits until this large data packet is forwarded before sending a message to remove a pause. Thus, a latency may result. This latency, for example, may delay the forwarding of a short burst of smaller packets and thus bandwidth is under-utilized.

Bandwidth may also be underutilized when basing the flow control on a given PPG. A given PPG is typically a constant PPG. A constant PPG assumes the receiving node maintains a constant processing rate as data is received and/or forwarded. This assumption may lead to under-utilized bandwidth. For one example, the node may have a plurality of ports and some ports are receiving or forwarding a lower amount of data traffic as compared to other ports. As a result, the receiving node may have available resources (e.g., processing power, memory, bandwidth, etc.) for a period of time those ports are receiving or forwarding less data traffic. Thus, bandwidth is underutilized in this multi-port example that assumes a constant processing rate.

One possible solution to underutilized bandwidth for flow control via a given PPG is to adjust the PPG based on resource updates sent via in-band data packets. One way to provide in-band resource updates is described by the Ethernet standard. Yet the use of these in-band resource updates may not be timely. Data traffic patterns may change and thus resources available in one time period may quickly become unavailable in another time period. The timeliness of resource updates may be even more problematic as communication mediums linking nodes continue to operate at higher and higher link speeds and disparities in node throughput rates become greater.

In one example, a node is to forward data packets via a communication link coupled to another node. The node is to receive an indication of a resource level associated with one or more of ports among the other node's ingress and egress ports. The indication to be received via another communication link (e.g., a side-band communication link) coupled to the other node. The node then forwards one or more data packets associated with data to the other node based on the indicated resource level received via the other communication link.

Figure 1:
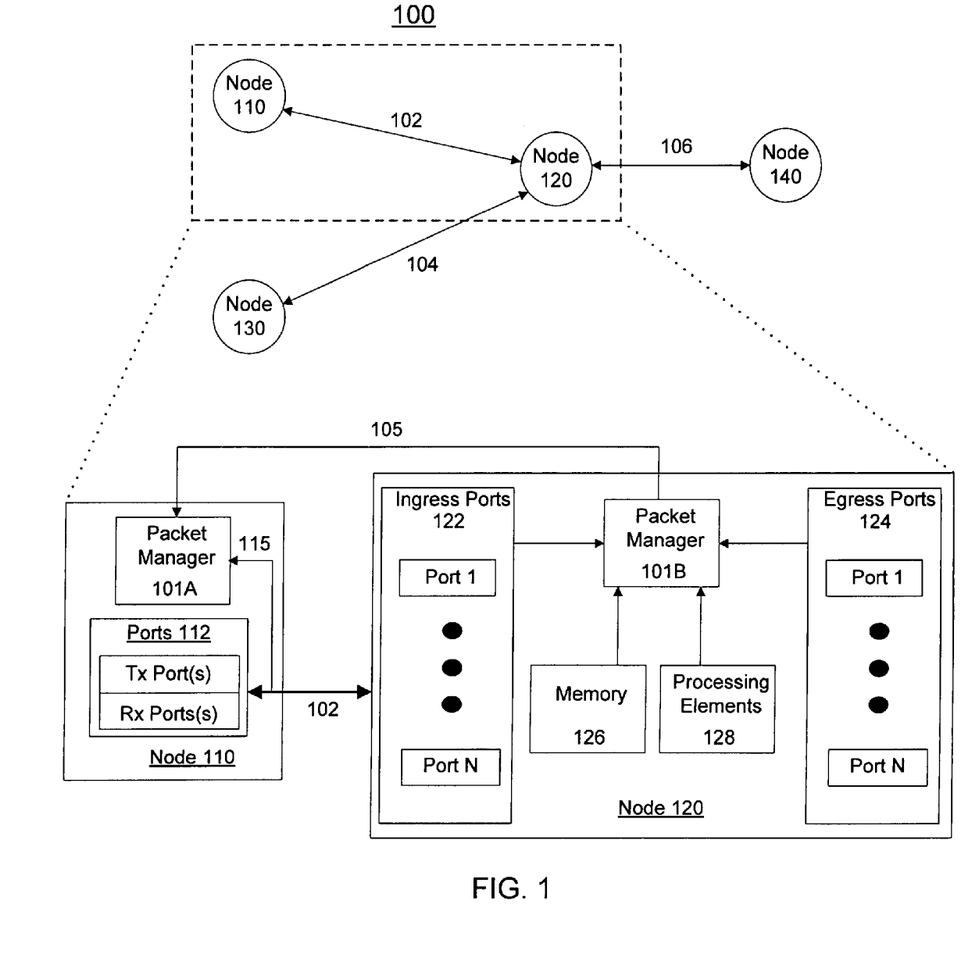
FIG. 1 is an illustration of elements of an example network.

FIG. 1 is an illustration of elements of an example network 100. Network 100 may operate in compliance with one or more industry standards such Ethernet, Advanced Switching Interconnect (ASI), Synchronous Optical NETwork (SONET), Asynchronous Transfer Mode (ATM), IEEE 802.11 and/or IEEE 802.16.

In one example, Network 100 is a Local Area Network (LAN) operating in compliance with the Ethernet standard. Additionally, elements coupled in network 100 (e.g., nodes 110-140) may forward data on network 100. These elements may also operate in compliance with the Ethernet standard and may route/forward the data via point-to-point communication links 102, 104 and 106. The data to be forwarded may be in the form of one or more data frames or data packets. These data packets may include an Ethernet header. In one example, the rate at which each receiving node on network 100 processes the one or more data packets and/or forwards the data packets to another element is referred to as a throughput capability.

In one example, throughput capabilities may be based, at least in part, on the resources available to the node. These resources may be associated with one or more ports in a node (e.g., ingress and egress ports) via which data is forwarded or received to/from other nodes in network 100. The resources may include, but are not limited to, the capacity or number of buffers used by the one or more ports, processing elements residing at or responsive to the ports, the bandwidth available to the ports (e.g., number of channels, link properties, congestion conditions, etc.) and node memory available to the one or more ports.

In one implementation, as depicted in the blown up portion of FIG. 1, node 120 includes a plurality of ingress ports 122 and a plurality of egress ports 124. These ports may be associated with resources included in node 120 to receive, process and/or forward data from one or more nodes in network 100 (e.g., from node 110 via communication link 102). In one example, these resources may include memory 126 and processing elements 128.

Also included in node 120 is a packet manager 101B. Packet manager 101B is coupled to a packet manager 101A in node 110 via another communication link 105. In one example, data to be forwarded through network 100 is forwarded via communication link 102 from node 110 to node 120 (e.g., an in-band communication link). In this example, communication link 105 is a side-band or out-of-band communication link relative to the in-band communication link 102. Thus, the side-band communication link 105 in this example is another communication link separate from communication link 105 and is used by packet manager 101B in node 120 to communicate with packet manager 101A in node 110.

Although depicted as a unidirectional communication link in FIG. 1, in other examples, communication link 105 may be a bidirectional communication link (not shown) to allow packet manager 101A to exchange information with packet manager 101B. In yet another example, communication link 105 may be a multi-drop bus (not shown) via which node 120 may indicate resource levels to packet managers located in other nodes and coupled to the multi-drop bus.

In one example, as described in more detail below, packet manager 101B in node 120 may monitor one or more resource levels associated with ingress and egress ports 122, 124 and then communicate or indicate those resource levels to packet manager 101A in node 110. Based on the indicated one or more resource levels, Node 110 may then forward data to node 120 through a transmit (Tx) port among ports 112 via communication link 102.

In one example, as described in greater detail below, the resource levels indicated by packet manager 101B in node 120 may result in packet manager 101A temporarily implementing in-band flow control measures. To accomplish this, in one example, packet manager 101A uses communication link 115 to monitor data forwarded through ports 112. Based on this monitoring, packet manager 101A may change the rate at which one or more data packets associated with the data are forwarded to node 120. For example, the rate may be changed or modified to meet a target data rate.

Figure 2:
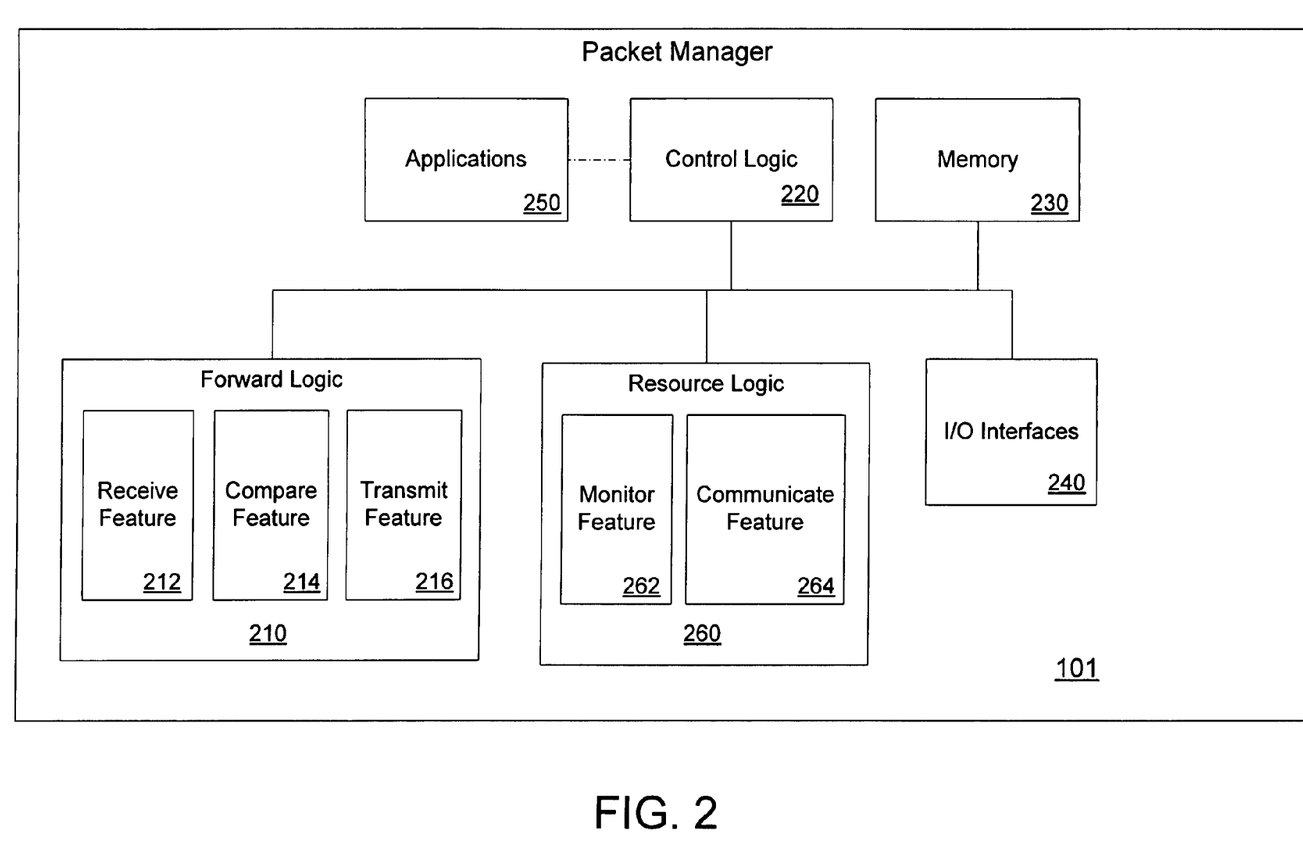
FIG. 2 is an example block diagram of a packet manager architecture.

FIG. 2 is an example block diagram of a packet manager 101 architecture. In FIG. 2, packet manager 101 includes forward logic 210, resource logic 260, control logic 220, memory 230, input/output (I/O) interfaces 240, and optionally one or more applications 250, each coupled as depicted.

In one example, the elements portrayed in FIG. 2's block diagram may be node or electronic system resources allocated to support or enable packet manager 101 as described in this disclosure. For example, forward logic 210, control logic 220 and resource logic 260 may each or collectively represent any of a wide variety of logic device(s) or executable content a node or an electronic system may allocate to implement a packet manager 101. These logic device(s) may include a microprocessor, network processor, microcontroller, field programmable gate array (FPGA), application specific integrated chip (ASIC), or executable content to implement such control features, or any combination thereof.

In FIG. 2, resource logic 260 includes monitor feature 262 and communicate feature 264. In one implementation, resource logic 260, responsive to a packet manager 101, uses these features to monitor the resource levels associated with one or more ports among a node's ingress and egress ports and communicate or indicate those resource levels to the other node.

In FIG. 2, forward logic 210 includes receive feature 212, compare feature 214 and transmit feature 216. In one implementation, forward logic 210, responsive to packet manager 101, uses these features to receive an indication of a resource level associated with one or more ports among a node's ingress and egress ports. Based on that indication, forward logic 210 uses these features to forward or transmit one or more data packets associated with data on a communication link to the node.

Control logic 220 may control the overall operation of packet manager 101 and as mentioned above, may represent any of a wide variety of logic device(s) or executable content to implement the control of packet manager 101. In alternate examples, the features and functionality of control logic 220 may be implemented within forward logic 210 and/or resource logic 260.

According to one example, memory 230 is used by forward logic 210 or resource logic 260 to temporarily store information. For example, information related to the resources associated with ports in a receiving node and indicating those resources to the forwarding node or information related to the forwarding of one or more data packets associated with data to be forwarded to the receiving node. Memory 230 may also store executable content. The executable content may be used by control logic 220, forward logic 210 or resource logic 260 to implement or activate features or elements of packet manager 101.

I/O interfaces 240 may provide a communications interface via a communication medium or link between packet manager 101 and a node or elements of an electronic system. As a result, I/O interfaces 240 may enable forward logic 210, control logic 220 or resource logic 260 to receive a series of instructions from software external to the elements allocated to support packet manager 101. The series of instructions may activate forward logic 210, control logic 220 or resource logic 260 to implement one or more features of packet manager 101.

In one example, packet manager 101 includes one or more applications 250 to provide internal instructions to control logic 220. Such applications 250 may be activated to generate a user interface, e.g., a graphical user interface (GUI), to enable administrative features, and the like. For example, a GUI may provide a user access to memory 230 to modify or update information to facilitate or implement the monitoring of resource levels associated with ports in a node and indicating those resource levels to another node. The GUI may also allow a user to modify or update information to forward one or more data packets from the other node based on the indicated resource levels.

In another example, applications 250 may include one or more application interfaces to enable external applications to provide instructions to control logic 220. One such external application could be a GUI as described above.

Figure 3:
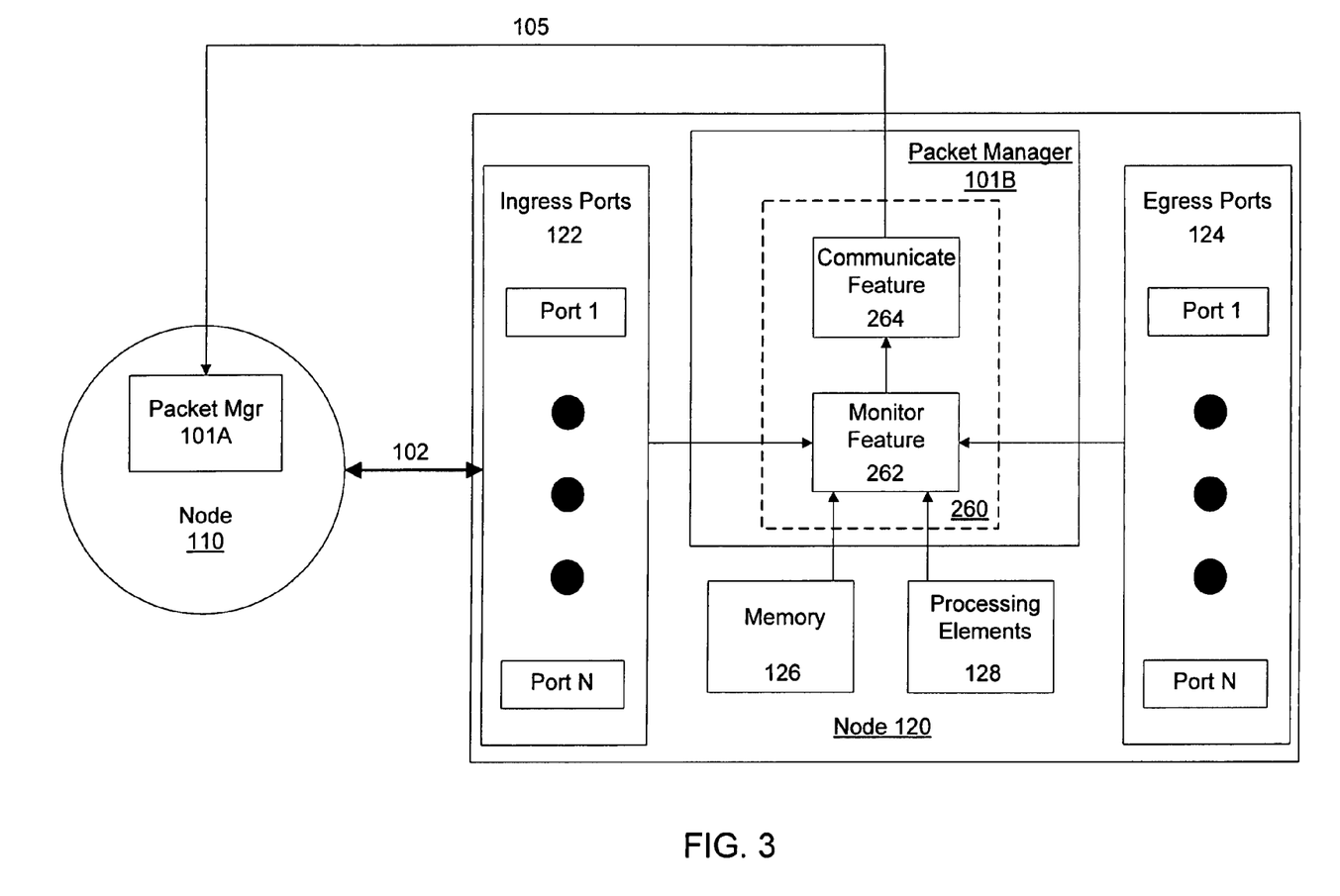
FIG. 3 is an example block diagram of a node including a packet manager to monitor resource levels and indicate those resource levels to a packet manager in another node.

FIG. 3 is an example block diagram of node 120 including a packet manager 101B to monitor resource levels and indicate those resource levels to a packet manager 101A in node 110. In one example, packet manager 101B indicates the resource levels associated with ingress and egress ports 122, 124.

As briefly mentioned above, the resources associated with one or more ports in a node may include the capacity or number of buffer used by the one or more ports, processing elements residing at or responsive to the ports, the bandwidth available to the ports and node memory available. In one implementation, memory 126 may include some of these resources such as buffer resources available to specific ingress and egress ports 122, 124. Memory 126 may also include node memory that may be available to any element located within node 120 (e.g., processing elements 128, packet manager 101B, ingress and egress ports 122, 124, etc.). Thus, memory 126 may also include packet manager 101B's memory 230 depicted in FIG. 2.

Processing elements 128 may also include some of these resources. For example, processing elements 128 may include one or more processing elements to facilitate the processing and/or forwarding of data received by node 120. This may include one or more microprocessors, network processors, microcontrollers, FPGAs, ASICs, or executable content, to for example, provide services to or enable ingress and egress ports 122, 124 to perform lookups, access node or buffer memory, arbitration of limited node resources, encode/decode data packets, encapsulate/unencapsulate data packets, etc. Processing elements 128 may also include control logic located within each ingress and egress port 122, 124 or responsive to ingress and egress ports 122, 124 to facilitate the forwarding of data to or through these ports.

In one implementation, monitor feature 262 gathers and then temporary stores (e.g., in memory 230) information for the resource levels associated with ports in ingress ports 122 and egress ports 124. In this implementation, communicate feature 264 accesses that information and encodes the information to communicate/indicate the resource levels to packet manager 101A in node 110 via communication link 105. In one example, communication link 105 may include one or more signal paths for communicate feature 264 to send the resource information in a multiplexed manner.

In one implementation, a source synchronous scheme can be used for signaling or indicating resource levels associated with the ports of ingress and egress ports 122, 124 of node 120 via communication link 105 to node 110. As depicted in the timing diagram of FIG. 4, in one example, communication link 105 includes clock signal path 105A, synchronization (sync) signal path 105B and data signal path 105C.

Figure 4:
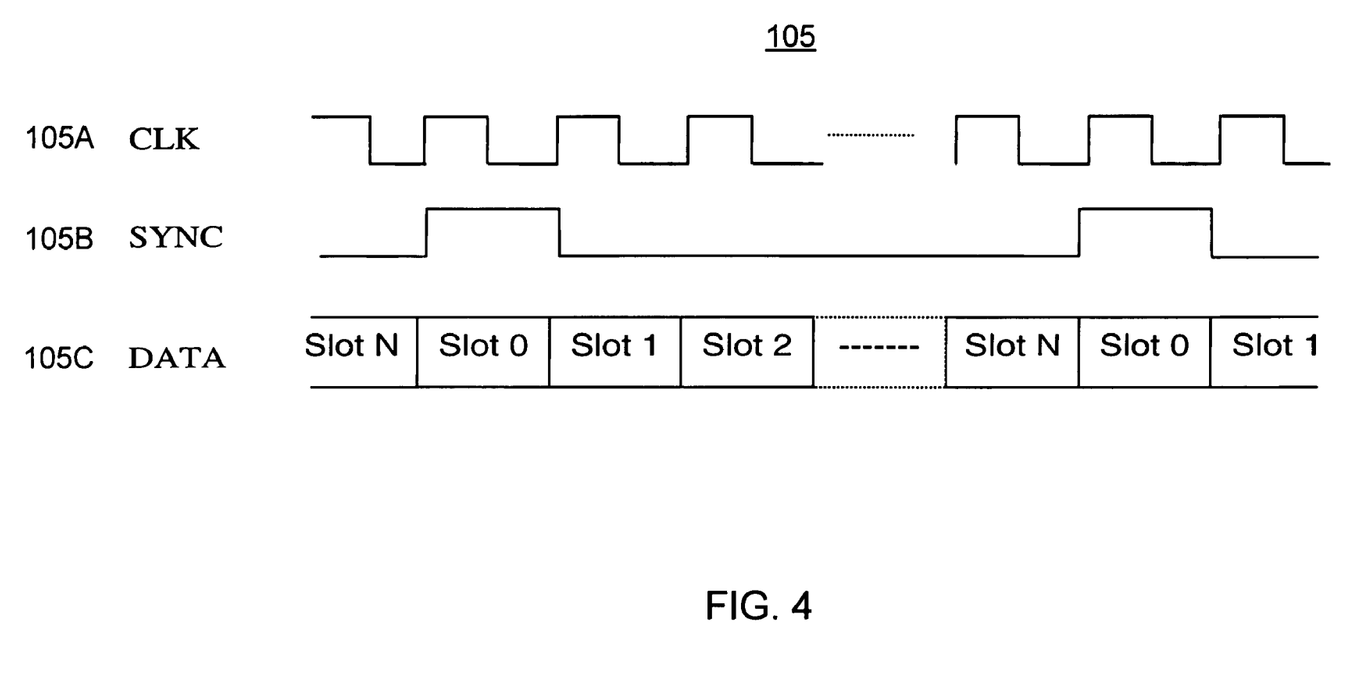
FIG. 4 is an example interface timing diagram to indicate the resources levels to the other node.

In this example, communicate feature 264 may multiplex the information for resource levels associated with one or more ports among ingress and egress ports 122, 124 and send it via communication link 105 in a time division, multiplexed manner. Each slot in the timing diagram may include n-bits of data, with "n" dependant on either the number of signal paths (e.g., parallel signal paths) included in signal path 105C and/or on the size of the slot (e.g., number of clock cycles assigned to a given slot). In one example, a pulse on sync signal path 105B indicates the beginning port of the ports of ingress and egress ports 122, 124. As a result, each pulse of sync signal path 105B may indicate the beginning of a sequence of ports. Each port assigned to a given slot as shown in FIG. 4.

In one implementation, an n-bit slot is used to indicate resource levels associated with one or more ports among ingress and egress ports 122, 124. For example, an n-bit slot may indicate available buffer or queue capacity for a given port. The more bits in the n-bit slot the more detailed the available buffer capacity indication. For example, by selectively asserting bits, a 4-bit slot may indicate whether a port's buffer is empty, ¼, ½, ¾ or full. In another example, a 10-bit slot may provide close to an exact buffer level in kilobits (Kb) for a buffer with a storage capacity of 1 megabit (Mb). In yet another example, a 1-bit slot is used to indicate general buffer availability such as an indication of whether the buffer is full or close to full.

In one implementation, in an Ethernet context, a port in egress port 124 may have received a pause frame from a node receiving data forwarded from that port. That pause frame may indicate a congestion condition at the port. This indication of a congestion condition may be encoded by and relayed from node 120 to node 110. In one example, a 1-bit slot associated with that port in egress port 124 is used to indicate the congestion condition at the port in egress pot 124. Thus, an indication of whether a congestion condition exists at a port may indicate available bandwidth at the port.

In another implementation, a port in ingress or egress ports 122, 124 may be receiving an indication from a processing element or a memory controller for a memory associated with the port that it is receiving multiple requests and the port's request is a lower priority than the other requests. The port may have to wait until the higher priority requests are processed by the processing element or the memory. In this example, this indication of congestion at the processing element or memory may be encoded by communicate feature 264 and relayed to node 110 via data signal path 105C in a 1-bit slot associated with the port. As a result, a resource level that includes available processing elements or memory associated with the port may be indicated via this 1-bit slot.

Figure 5A:
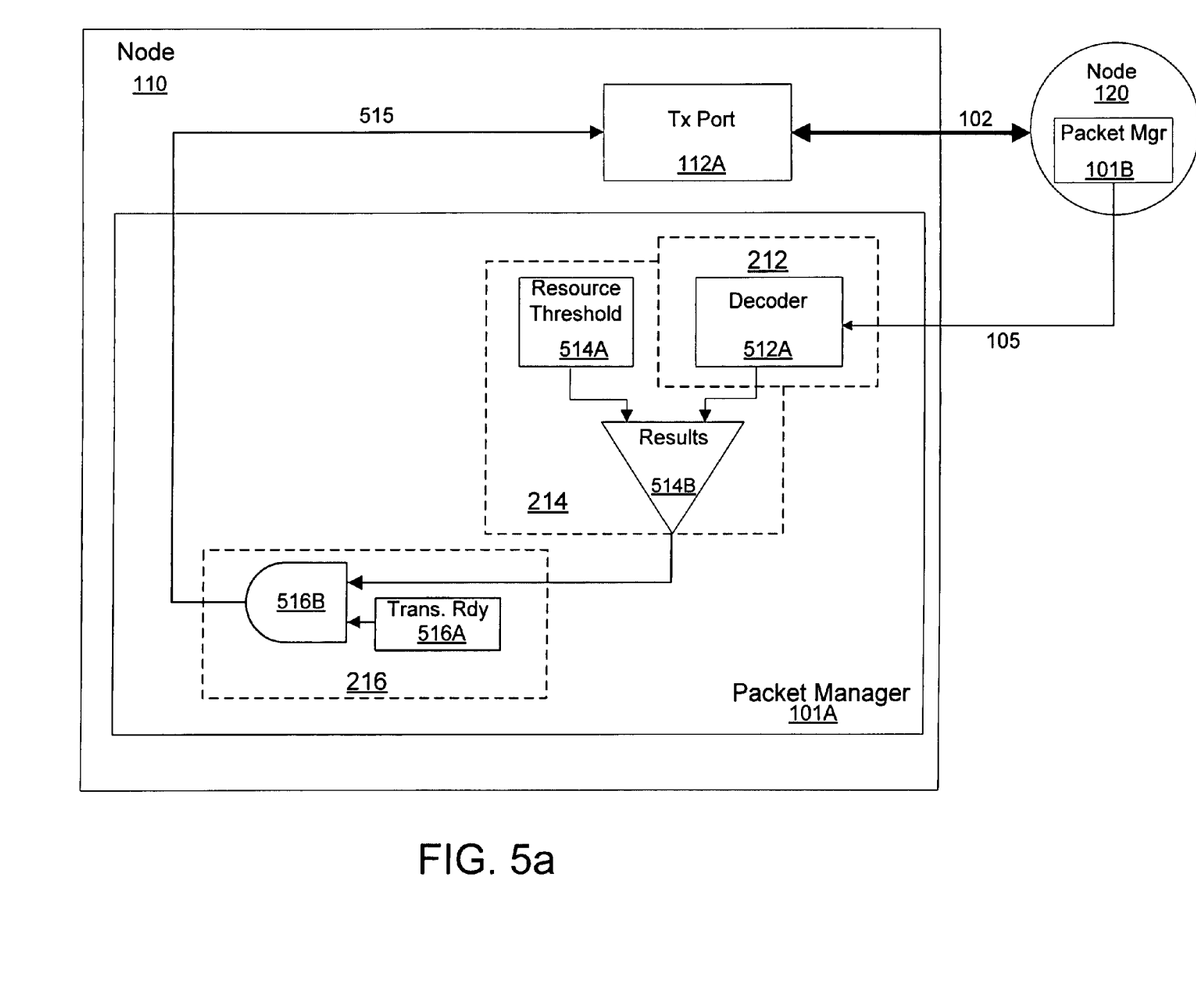
FIGS. 5a-b are example block diagrams of the other node including a packet manager to forward data based on the indicated resource levels.
Figure 5B:
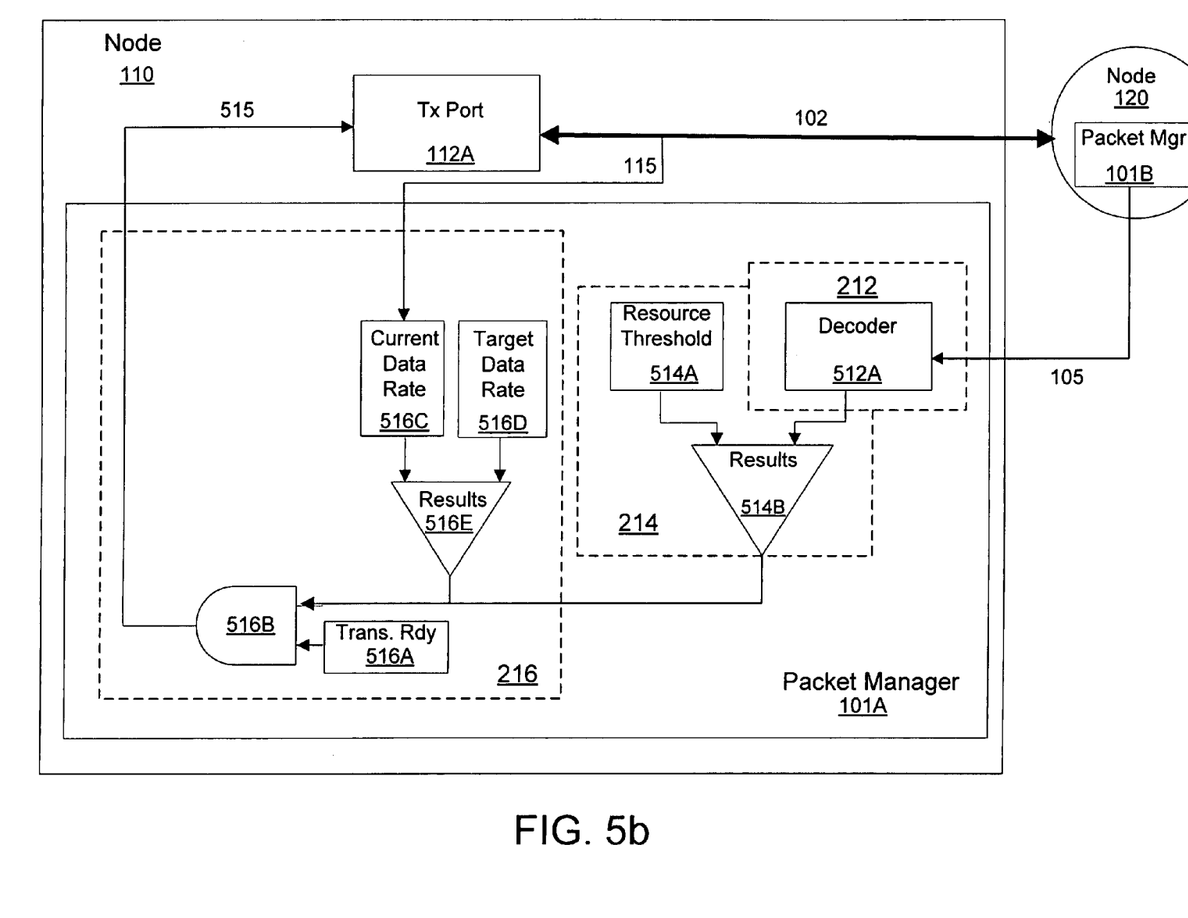

FIGS. 5a-b are example block diagrams of node 110 including packet manager 101A to forward data based on the indicated resource levels associated with ports in node 120. As depicted in FIGS. 5a-b, node 110 includes a packet manager 101A and packet manager 101A is coupled to packet manager 101B in node 120 via communication link 105. Packet manager 101A is also coupled to a transmit port 112A via communication link 515. Transmit port 112A is coupled to communication link 102 to forward data from node 110 to node 120.

In one implementation, the packet manager 101A portrayed in FIGS. 5a-b includes a decoder 512A to receive an indication of resource levels associated with ports within node 120. As described above, in one example, this indication may be received via communication link 105 in a time division, multiplexed manner to indicate resource levels associated with the one or more ports among ingress and egress ports 122, 124 of node 120. In one example, decoder 512A may de-multiplex this time division, multiplexed signal to determine the indicated resource levels of the ports.

In one example, the packet manager 101A in FIGS. 5*a-b* also includes resource threshold 514A. Information related to a resource threshold for each port in ingress and egress ports 122, 124 is maintained/stored in resource threshold 514A. This information may include information for the resources associated with each port such as each port's buffer capacity or other resources that may impact the throughput of data at node 120. In one example, resource threshold 514A may be a portion of a memory (e.g., memory 230) such as a memory register.

In one example, the resource information stored in resource threshold 514A is based on one or more parameters exchanged when establishing/activating communication link 102 and/or communication link 105 between node 110 and node 120. In another example, resource information may be updated when a resource associated with one or more ports changes, e.g., a sector of memory associated with a port fails or is enlarge or a processing element is removed or added. In yet another example, a user (e.g., through a user interface, or setting one or more manual switches to a memory register) may modify or enter a fixed resource threshold value for each of the ports in ingress and egress ports 122, 124. This fixed resource threshold value may be stored in resource threshold 514A.

In one implementation, node 110 may include a media access controller or MAC (not shown) to facilitate and/or control the forwarding of data from node 110 to destinations and/or intermediate destinations such as node 120. In one example, the MAC may communicate with packet manager 101A to indicate whether data packets associated with data to be forwarded to node 120 are ready for transmission. The indication may be maintained in transmit ready 516A. In one example, transmit ready 516A may be a portion of a memory (e.g., memory 230) such as a memory register. In that regard, a bit flag stored in transmit ready 516A may be asserted (e.g., bit flag=1) to indicate the MAC is ready to forward data packets and may be de-asserted (e.g., bit flag=0) to indicate the MAC is not ready to forward data packets.

In one example, the one or more data packets are to be forwarded to node 120 from node 110 through transmit port 112A coupled to communication link 102. Forward logic 210 may activate receive feature 212. Receive feature 212 may monitor decoder 512A and obtain resource levels associated with the ports in ingress and egress ports 122, 124 in node 120 as they are decoded by decoder 512A. This information may be temporarily stored in a memory, e.g., memory 230.

Forward logic 210 may then activate compare feature 214. Compare feature 214, in one example, obtains the resource threshold information from resource threshold 514A. Compare feature 214 may then compare that information to the decoded resource levels obtained by receive feature 212 from decoder 512A. The results of the comparison may be temporarily stored in results 514B. In one example, results 514B may be a portion of a memory (e.g., memory 230) such as a memory register.

In one implementation, the results of the comparison may be indicated/communicated by a bit flag. The bit flag may be selectively asserted based on whether the indicated resource levels associated with the ports in ingress and egress ports 122, 124 are less than the resource threshold stored/maintained in resource threshold 514A. For example, receive feature 212 may receive an indication that a resource level associated with the one or more ports to receive and/or forward the one or more data packets is at a given level, e.g., available buffer capacity, available processing elements, available memory or bandwidth available to the one or more ports. In addition, the threshold resource level value in resource threshold 514A may be lower than the indicated resource level associated with the one or more ports. In this example, compare feature 214 may assert the bit flag to indicate that the indicate resource level is higher than the resource threshold value. Compare feature 214 may de-assert the bit flag if an indicated resource level later falls below the resource threshold value. Compare feature 214 may temporarily store the selectively asserted bit flag in results 514B.

FIG. 5*a* depicts an implementation where transmit feature 216 of forward logic 210 forwards one or more data packets associated with data based on the selectively asserted bit flag in results 514B, as described above. In this implementation, forward logic 210 activates transmit feature 216. In one example, transmit feature 216 may obtain and/or access the bit flags in results 514B and transmit ready 516A. As depicted in FIG. 5*a*, in one example, a logical AND operation is performed at 516B by transmit feature 216. In one example, if both bit flags are asserted, then transmit feature 216 may indicate to transmit port 112A via communication link 515 that the one or more data packets can be forwarded to node 120. If either bit flag is de-asserted, transmit feature 216 may indicate to transmit port 112A to not forward the one or more data packets.

In one example, the indicated resource level rises above the resource threshold, compare feature 214 may then assert the bit flag and store it in results 514B. Transmit feature 216, provided that the bit flag in transmit ready 516A is also asserted, may then indicate to transmit port 112A that the one or more data packets can be forwarded to node 120 via communication link 102.

FIG. 5*b* depicts an implementation where forward logic 210 of packet manager 101A changes the rate the one or more data packets are forwarded based on the selectively asserted bit flag stored/maintained in results 514B as described above. In this implementation, the bit flag in results 514B is unasserted, e.g., indicates resource levels are below the resource threshold. In one example, this indicates to transmit feature 216 to implement in-band flow control measures by changing the rate at which the one or more data packets are forwarded. In one example, to implement in-band flow control measures, transmit feature 216 includes current data rate 516C and target data rate 516D. Both current data rate 516C and target data rate 516D may be a portion of a memory (e.g., memory 230) such as a memory register.

In one example, transmit feature 216 will monitor communication link 102 via communication link 115, determine the rate at which the one or more data packets are forwarded to node 120 and store/maintain that rate in current data rate 516C, e.g., based on packets/unit of time or bits/unit of time. This current data rate value is then compared to a target data rate value maintained/stored in 516D.

In one example, similar to how the results were stored for results 514B, the comparison results may be temporarily stored in results 516E. Results 516E may also be a portion of a memory (e.g., memory 230) such as a memory register. Thus, the comparison results may be indicated/communicated by a bit flag. The bit flag may be selectively asserted based on whether the current data rate is greater or less than the target data rate stored/maintained in target data rate 516D. For example, if the current data rate value is greater than the target data rate value the bit flag is unasserted. If the current data rate value is less than the target data rate value, the bit flag is asserted.

In one example, transmit feature 216 obtains and/or accesses the bit flags in results 516E and transmit ready 516A. As depicted in FIG. 5*b*, in one example, a logical AND operation is performed at 516B by transmit feature 216. In one example, if both bit flags are asserted (e.g., current data rate is less than target data rate), then transmit feature 216 may indicate to transmit port 112A via communication link 515 that one or more data packets can be forwarded to node 120. If either bit flag is de-asserted, transmit feature 216 may indicate to transmit port 112A to not forward the one or more data packets.

In this implementation, if the bit flag in results 514B is or later becomes asserted, then the comparison results maintained in results 516E are ignored. In this instance, the in-band flow control measures described for FIG. 5b are not implemented until the bit flag in results 514B is unasserted again.

In one example, the target data rate stored/maintained in target data rate 516D is based on one or more parameters exchanged when establishing/activating communication link 102 or communication link 105 between node 110 and node 120. In another example, the target data rate is based on information exchanged on a periodic basis between node 120 and node 110 (e.g., during run-time). In yet another example, a user (e.g., through a user interface, or setting one or more manual switches to a memory register) may modify or enter a fixed target data rate value for transmit port 112A. This fixed target data rate value may be stored in target data rate 516D.

In one example, the target data rate stored/maintained in target data rate 516D may also be based on a guaranteed minimum data packet processing bandwidth or throughput for data forwarded to the ports in ingress and egress ports 122, 124. For example, the guaranteed minimum throughput may be based on the requirements of an industry standard such as the Ethernet standard (e.g., 10 Gigabits/sec) or may be based on a quality of service (QoS) commitment for types of data associated with a given traffic and/or priority class. For example, a QoS commitment for data associated with a high priority or an important traffic class may result in a guaranteed minimum throughput that requires a higher target data rate. A lower target data rate may be associated with low priority or less important traffic classes.

Figure 6:
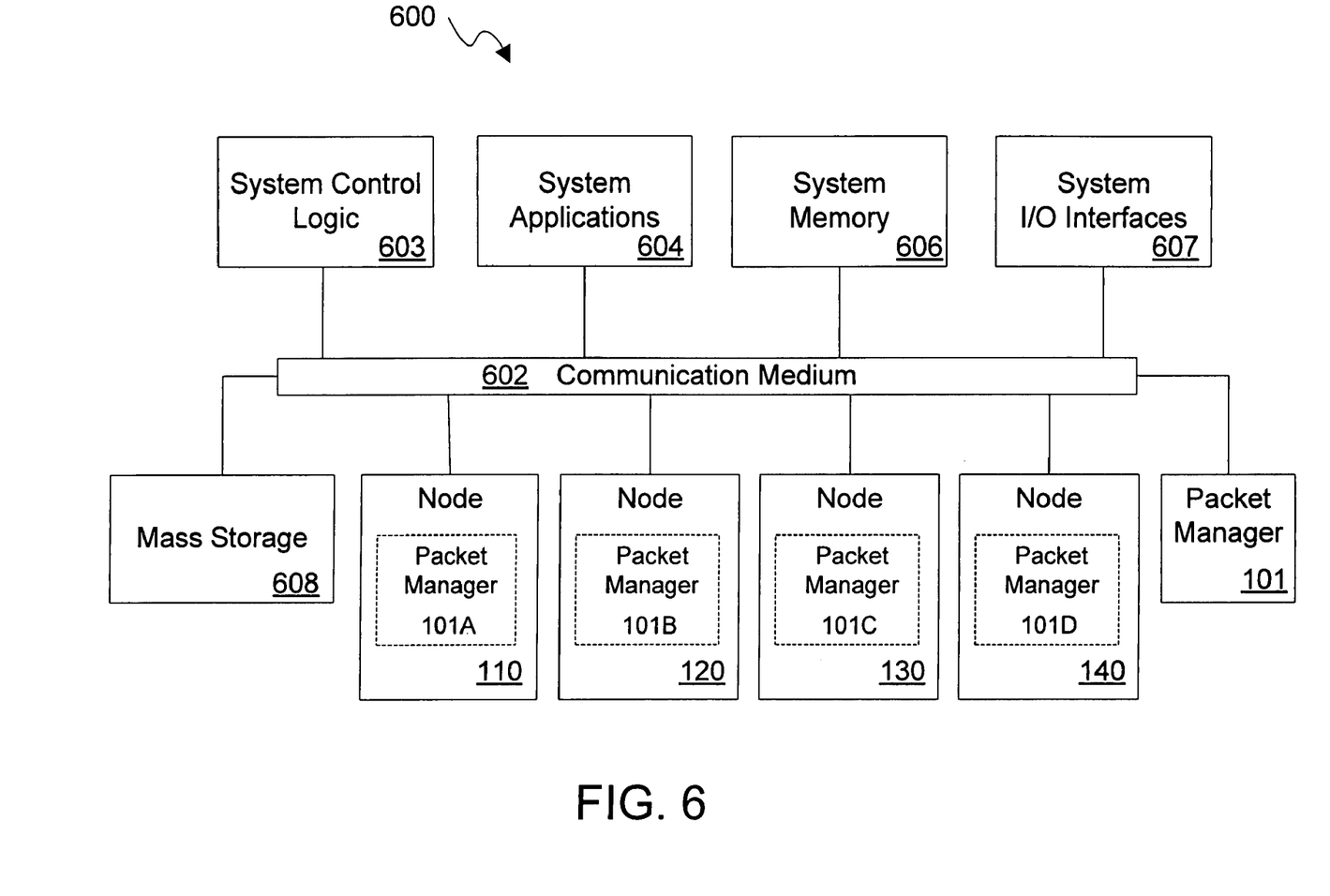
FIG. 6 is a block diagram of an example electronic system.

FIG. 6 is a block diagram of an example electronic system 600. Electronic system 600 includes communication medium 602, system control logic 603, system applications 604, system memory 606, I/O interfaces 607, mass storage 608, nodes 110, 120, 130, 140 and packet manager 101, each coupled as depicted.

In one example, data is forwarded through one or more communication links that may incorporate network 100 (see FIG. 1) within electronic system 600. These communication links may be included within communication medium 602 and may consist of one or more point-to-point communication links such as communication links 102, 104 and 106 as shown in FIG. 1. The data may be forwarded from a node (e.g., node 110) to another node (e.g., node 120) via these communication links.

Nodes 110, 120, 130 and 140 may include one or more of a switch blade or a router for electronic system 600 or one or more of these node may represent elements of electronic system 600 which act as either an input (ingress) or output (egress) node or endpoint situated on communication medium 602. These nodes may include any of a number of hardware and/or software element(s) to receive and transmit data within electronic system 600. Thus, nodes 110, 120, 130 and 140 may include one or more of a bridge, a microprocessor, network processor, software application, embedded logic, or the like.

In one example, system control logic 603 controls the overall operation of electronic system 600 and system applications 604 may provide internal instructions to system control logic 603. This may include instructions to facilitate system control logic 603's management and/or control of elements of electronic system 600.

In one example, control logic 603 may represent any of a wide variety of logic device(s) or executable content to control the overall operation of electronic system 600. These logic device(s) may include a microprocessor, network processor, microcontroller, FPGA, ASIC, executable content, or any combination thereof.

System memory 606 may store information such as temporary variables or intermediate information. This information may be stored during execution of instructions by system control logic 603. System memory 606 may also temporarily store at least portions of data selected for forwarding by electronic system 600 to either elements within electronic system 600 (e.g., nodes 110, 120, 130 or 140) via communication medium 602 or elements remote to electronic system 600 via system I/O interfaces 607. The data may either originate from electronic system 600 (e.g., system control logic 603 or system applications 604) or may be received by electronic system 600 via system I/O interfaces 607.

In one example, one or more nodes 110, 120, 130 or 140 may act as an I/O endpoint for electronic system 600 which is linked (e.g., through a wired or wireless communication link) to another I/O processing endpoint in another electronic system through system I/O interfaces 607. This communication link may operate using communication standards such as IEEE 802.3, SONET, ATM, IEEE 802.11, IEEE 802.16 or the like.

As depicted in FIG. 6, electronic system 600 also includes a packet manager 101. In one example, packet manager 101 may operate as an element within and/or responsive to electronic system 600. In another example, as depicted by the dashed boxes in nodes 110, 120, 130, 140 in FIG. 6, packet manager 106 is resident within these nodes.

In one implementation, packet manager 101 may facilitate the forwarding of data on communication links between elements within electronic system 600 and elements located remotely to electronic system 600. For example, nodes 110, 120, 130 or 140 that utilize I/O interfaces 607, may couple to remote nodes via one or more wired and/or wireless communication links. Packet manager 101 may facilitate the forwarding of data by reducing and/or minimizing the effects of possible congestion on these communication links.

In one example electronic system 600 may be a modular platform system that operates in compliance with an industry standard known as the PCI Industrial Computer Manufacturers Group (PICMG), Advanced Telecommunications Computing Architecture (ATCA) Base Specification, PICMG 3.0 Rev. 1.0, published Dec. 30, 2002, and/or later versions of the specification ("the ATCA specification"). In this example nodes, 110, 120, 130 or 140 may be boards and/or blades that operate in compliance with the ATCA specification and may forward at least portions of data to other elements of electronic system 600 using in-band (e.g., a switch fabric) communication channels. These in-band communication channels may include communication links 102, 104 or 106. Additionally, these nodes may be coupled to each other via out-of-band or side-band communication channels such as communication link 105 between nodes 110 and 120. At least a portion of these channels may be routed through a backplane for the modular platform system.

In one example, nodes 110 and 120 may forward data over a switch fabric operating in compliance with one or more communication protocols. These protocols may be associated with and/or described by sub-set specifications to the ATCA specification and are typically referred to as the "PICMG 3.x specifications." The PICMG 3.x specifications include, but are not limited to, Ethernet/Fibre Channel (PICMG 3.1), Infiniband (PICMG 3.2), StarFabric (PICMG 3.3), PCI-Express/Advanced Switching (PICMG 3.4), Advanced Fabric Interconnect/S-RapidIO (PICMG 3.5) and Packet Routing Switch (PICMG 3.6).

Referring again to memory 230 in FIG. 2 and system memory 606 in FIG. 6. System memory 606 and/or memory 230 may include a wide variety of memory media including but not limited to volatile memory, non-volatile memory, flash, programmable variables or states, random access memory (RAM), read-only memory (ROM), flash, or other static or dynamic storage media.

In one example, machine-readable instructions can be provided to system memory 606 and/or memory 230 from a form of machine-accessible medium. A machine-accessible medium may represent any mechanism that provides (i.e., stores and/or transmits) information in a form readable by a machine (e.g., nodes 110, 120, 130, 140 or packet manager 101). For example, a machine-accessible medium may include: ROM; RAM; magnetic disk storage media; optical storage media; flash memory devices; electrical, optical, acoustical or other form of propagated signals (e.g., carrier waves, infrared signals, digital signals); and the like.

Referring again to FIG. 1 and FIG. 3, memory 126 may include RAM. RAM may include, but is not limited to, ferroelectric RAM (FRAM), dynamic RAM (DRAM), static RAM (SRAM), extended data output RAM (EDO RAM), synchronous DRAM (SDRAM).

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References made in the specification to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in his is regard.

What is claimed is:

1. In a node to forward data packets via a communication link to another node, a method comprising:
    receiving an indication of a resource level associated with one or more ports among the other node's ingress and egress ports, the indication to be received via a side-band communication link coupled to the other node; and
    forwarding one or more data packets associated with data to the other node based on the indicated resource level received via the side-band communication link,
    wherein the side-band communication link includes a clock signal path, a synchronization path, and a data signal path,
    wherein the indication of the resource level is received via the data signal path of the side-band communication link in a time division, multiplexed manner, the time division, multiplexed manner to include an n-bit slot associated with each port among the other node's ingress and egress ports.

2. A method according to claim 1, wherein forwarding the one or more data packets further comprises:
    stopping the forwarding of the one or more data packets if the indicated resource level is less than a threshold resource level; and
    restarting the forwarding of the one or more data packets based on receiving another indication of the resource level associated with one or more ports among the other node's ingress and egress ports, the other indication received via the side-band communication link and indicating that the resource level equals or exceeds the threshold level.

3. A method according to claim 1, wherein forwarding the one or more data packets further comprises:
    changing a rate the one or more data packet are forwarded if the indicated resource level is less than a threshold resource level, the change based on:
        determining a current data rate for the one or more data packets,
        comparing the current data rate to a target data rate, and
        delaying the forwarding of the one or more data packets to the other node if the current data rate equals or exceeds the target data rate, the delay to maintain an average data rate; and
    removing the change, the removal based on receiving another indication of the resource level associated with the one or more ports among the other node's ingress and egress ports, the other indication received via the side-band communication link and indicating that the resource level equals or exceeds the threshold level.

4. A method according to claim 3, wherein the target data rate is based on a guaranteed minimum throughput for the communication link.

5. A method according to claim 4, wherein the guaranteed minimum throughput is based on a quality of service commitment for data associated with a given traffic class.

6. A method according to claim 1, wherein the communication link operates in compliance with the Ethernet standard.

7. A method according to claim 1, wherein the n-bit slot comprises a 1-bit slot to indicate a congestion condition.

8. An apparatus comprising:
    a node to forward data via a communication link to another node, the node including logic to receive indications of resource levels associated with a plurality of ports among the other node's ingress and egress ports, the logic to receive the indications via another communication link coupled between the nodes, wherein based on the indications, the logic is to forward one or more data packets associated with the data to the other node based on the indications of the resource levels received via the other communication link,
    wherein the other communication link includes a clock signal path, a synchronization path, and a data signal path, wherein the indications of the resource levels are communicated via the data signal path of the other communication link in a time division, multiplexed manner, the time division, multiplexed manner to include an n-bit slot associated with each port among the other node's ingress and egress ports.

9. An apparatus according to claim 8, wherein the logic to forward the one or more data packets further comprises the logic to:
    stop the forwarding of the one or more data packets if one of the indicated resource levels is less than a threshold resource level; and
    restart the forwarding of the one or more data packets based on receiving another indication of the one of the indicated resource levels associated with one or more ports among the other node's ingress and egress ports, the other indication received via the other communication link and indicating that the one of the indicated resource levels equals or exceeds the threshold level.

10. An apparatus according to claim 8, wherein to forward the one or more data packets further comprises the logic to:
change a rate the one or more data packet are forwarded if one of the indicated resource levels is less than a threshold resource level, the change based on:
determining a current data rate for the one or more data packets,
comparing the current data rate to a target data rate, and
delaying the forwarding of the one or more data packets to the other node if the current data rate equals or exceeds the target data rate, the delay to maintain an average data rate; and
remove the change, the removal based on receiving another indication of the one of the resource levels associated with the one or more ports among the other node's ingress and egress ports, the other indication received via the other communication link and indicating that the one of the resource level equals or exceeds the threshold level.

11. An apparatus according to claim 8, wherein the resource levels associated with the one or more ports among the other node's ingress and egress ports comprise at least one selected from the following group of: available buffer capacity, available processing elements, available memory responsive to the other node and bandwidth available to the one or more ports.

12. An apparatus according to claim 8, wherein the other communication link comprises a side-band communication link.

13. An apparatus comprising:
a node to receive data forwarded from another node via a communication link, the node including logic to monitor a resource level associated with one or more ports among the node's ingress and egress ports, the logic to indicate the monitored resource level to the other node via a side-band communication link coupled between the nodes, wherein based on the indication, the other node forwards one or more data packets associated with the data to the node via the communication link,
wherein the side-band communication link includes a clock signal path, a synchronization path, and a data signal path, wherein the indication of the monitored resource level is communicated via the data signal path of the side-band communication link in a time division, multiplexed manner, the time division, multiplexed manner to include an n-bit slot associated with each port among the node's ingress and egress ports.

14. An apparatus according to claim 13, wherein the resource level associated with the one or more ports among the other node's ingress and egress ports comprises at least one selected from the following group of: available buffer capacity, available processing elements, available memory responsive to the other node and bandwidth available to the one or more ports.

15. A system comprising:
a node including ingress and egress ports; and
another node coupled to the node, the other node to forward one or more data packets associated with data to the node via a communication link, the other node to include logic to receive an indication of a resource level associated with one or more ports among the node's ingress and egress ports, the logic to receive the indication via another communication link coupled between the nodes, wherein based on the indication, the logic is to forward one or more data packets associated with the data to the node,
wherein the other communication link includes a clock signal path, a synchronization path, and a data signal path, wherein the indication of the resource level is communicated via the data signal path of the other communication link in a time division, multiplexed manner, the time division, multiplexed manner to include an n-bit slot associated with each port among the node's ingress and egress ports.

16. A system according to claim 15, wherein the logic to forward the one or more data packets further comprises the logic to:
stop the forwarding of the one or more data packets if the indicated resource level is less than a threshold resource level; and
restart the forwarding of the one or more data packets based on receiving another indication of the resource level associated with one or more ports among the node's ingress and egress ports, the other indication received via the other communication link and indicating that the resource level equals or exceeds the threshold level.

17. A system according to claim 15, wherein the other communication link comprises a side-band communication link.

18. A system according to claim 15, wherein the resource level associated with the one or more ports among the node's ingress and egress ports comprises at least one selected from the following group of: available buffer capacity, available processing elements, available memory responsive to the node and bandwidth available to the one or more ports.

19. A system according to claim 15, wherein the node and the other node are to operate within a modular platform system, the modular platform system to operate in compliance with the Advanced Telecommunication Computing Architecture standard.

20. A machine-accessible medium comprising content, which, when executed by a machine causes the machine to:
receive indications of resource levels associated with a plurality of ports among another node's ingress and egress ports, the indication to be received via a side-band communication link coupled to the other node; and
forward one or more data packets to the other node via a communication link separate from the side-band communication link based on the indicated resource levels received via the side-band communication link,
wherein the side-band communication link includes a clock signal path, a synchronization path, and a data signal path, wherein the indications of the monitored resource levels are communicated via the data signal path of the side-band communication link in a time division, multiplexed manner, the time division, multiplexed manner to include an n-bit slot associated with each port among the other node's ingress and egress ports.

21. A machine-accessible medium according to claim 20, wherein the content that causes the machine to forward the one or more data packets further causes the machine to:
stop the forwarding of the one or more data packets if one of the indicated resource levels is less than a threshold resource level; and
restart the forwarding of the one or more data packets based on receiving another indication of the one of the resource levels associated with one or more ports among the other node's ingress and egress ports, the other indication received via the side-band communication link and indicating that the one of the resource level equals or exceeds the threshold level.

22. A machine-accessible medium according to claim 20, wherein the content that causes the machine to forward the one or more data packets further causes the machine to:

change a rate the one or more data packet are forwarded if one of the indicated resource levels is less than a threshold resource level, the change based on:
  determining a current data rate for the one or more data packets,
  comparing the current data rate to a target data rate, and
  delaying the forwarding of the one or more data packets to the other node if the current data rate equals or exceeds the target data rate, the delay to maintain an average data rate; and remove the change, the removal based on receiving another indication of the one of the resource levels associated with the one or more ports among the other node's ingress and egress ports, the other indication received via the side-band communication link and indicating that the one of the resource levels equals or exceeds the threshold level.

23. A machine-accessible medium according to claim 20, wherein the resource levels associated with the one or more ports among the other node's ingress and egress ports comprise at least one selected from the following group of: available buffer capacity, available processing elements and available memory responsive to the other node.

* * * * *